United States Patent
Gupta et al.

(10) Patent No.: US 8,498,615 B2
(45) Date of Patent: *Jul. 30, 2013

(54) SELF PROVISIONING OF WIRELESS TERMINALS IN WIRELESS NETWORKS

(75) Inventors: Amit Gupta, Livermore, CA (US); Daniel G. Collins, Plano, CA (US); Jahangir Mohammed, Santa Clara, CA (US)

(73) Assignee: Jasper Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/398,493

(22) Filed: Apr. 4, 2006

(65) Prior Publication Data

US 2006/0246949 A1    Nov. 2, 2006

Related U.S. Application Data

(63) Continuation-in-part of application No. 11/119,401, filed on Apr. 29, 2005.

(51) Int. Cl.
*H04M 1/66*    (2006.01)

(52) U.S. Cl.
USPC ............................ 455/411; 455/436; 455/450

(58) Field of Classification Search
USPC ........................... 455/432, 435, 411, 436, 450
See application file for complete search history.

(56) References Cited

U.S. PATENT DOCUMENTS

| | | | |
|---|---|---|---|
| 5,353,340 A | 10/1994 | Kunz | |
| 5,734,699 A | 3/1998 | Lu et al. | |
| 5,854,982 A | 12/1998 | Chambers et al. | |
| 5,943,619 A | 8/1999 | Coyne et al. | |
| 6,124,799 A | 9/2000 | Parker | |
| 6,584,310 B1 * | 6/2003 | Berenzweig | 455/432.1 |
| 7,027,813 B2 * | 4/2006 | Hicks et al. | 455/432.1 |
| 7,184,768 B2 * | 2/2007 | Hind et al. | 455/435.3 |
| 7,266,371 B1 | 9/2007 | Amin et al. | |
| 7,274,933 B2 * | 9/2007 | Zinn et al. | 455/435.2 |
| 7,366,510 B2 * | 4/2008 | Gunaratnam et al. | 455/435.2 |
| 7,395,083 B2 * | 7/2008 | Buckley | 455/552.1 |
| 2002/0154632 A1 | 10/2002 | Wang et al. | |
| 2002/0197991 A1 * | 12/2002 | Anvekar et al. | 455/432 |
| 2003/0022689 A1 * | 1/2003 | McElwain et al. | 455/551 |

(Continued)

FOREIGN PATENT DOCUMENTS

| | | |
|---|---|---|
| EP | 1229751 A1 | 8/2002 |
| EP | 1392077 A1 | 2/2004 |

(Continued)

OTHER PUBLICATIONS

ETSI TS 100 922 V7.1.1 (Jul. 1999) Digital Cellular Telecommunication Systems (Phase 2+); Subscriber Identity Modules (SIM) (GSM 02.17 version 7.1.1 Release 1998).

(Continued)

*Primary Examiner* — Kwasi Karikari

(74) *Attorney, Agent, or Firm* — Blakely Sokoloff Taylor & Zafman, LLP

(57) ABSTRACT

Acquiring telecommunications service is disclosed. A wireless signal is received from a wireless network. A network identification is decoded from the wireless signal. A subscriber identification is selected based at least in part on the decoded network identification, and wireless service is acquired from the wireless network.

18 Claims, 6 Drawing Sheets

U.S. PATENT DOCUMENTS

| | | | |
|---|---|---|---|
| 2003/0157935 A1 | 8/2003 | Kauhanen | |
| 2004/0043752 A1 | 3/2004 | Matsumura | |
| 2004/0097230 A1 | 5/2004 | Natarajan et al. | |
| 2004/0203744 A1 | 10/2004 | Hicks et al. | |
| 2005/0037755 A1* | 2/2005 | Hind et al. | 455/435.3 |
| 2005/0079863 A1* | 4/2005 | Macaluso | 455/419 |
| 2005/0097595 A1 | 5/2005 | Lipsanen et al. | |
| 2005/0113088 A1* | 5/2005 | Zinn et al. | 455/435.2 |
| 2006/0019647 A1 | 1/2006 | Muhonen et al. | |
| 2006/0173976 A1 | 8/2006 | Vincent et al. | |
| 2006/0205434 A1* | 9/2006 | Tom et al. | 455/558 |
| 2007/0026861 A1 | 2/2007 | Kuhn et al. | |

FOREIGN PATENT DOCUMENTS

| | | |
|---|---|---|
| EP | 1672945 A1 | 6/2006 |
| FR | 2790161 A1 | 8/2000 |
| FR | 2814029 A1 | 3/2002 |
| GB | 2389745 A | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |

OTHER PUBLICATIONS

3GPP TS 03.20 V9.0.0 (Jan. 2001) 3rd Generation Partnership Project; Digital Cellular Telecommunications System (Phase 2+) Security related network functions (Release 2000).

Office action in a corresponding U.S. Appl. No. 13/413,516 dated Feb. 7, 2013.

* cited by examiner

SELF PROVISIONING OF WIRELESS TERMINALS IN WIRELESS NETWORKS This application is a continuation in part of co-pending U.S. patent application Ser. No. 11/119,401 entitled SELF PROVISIONING OF WIRELESS TERMINALS IN CELLULAR NETWORKS filed Apr. 29, 2005.

BACKGROUND OF THE INVENTION

In a wireless system, the wireless terminal has a Subscriber Identity Module (SIM), which contains the identity of the subscriber. One of the primary functions of the wireless terminal with its SIM in conjunction with the wireless network system is to authenticate the validity of the wireless terminal (for example, a cell phone) and the wireless terminal's subscription to the network. The SIM is typically a microchip that is located on a plastic card, a SIM card, which is approximately 1 cm square. The SIM card is then placed in a slot of the wireless terminal to establish the unique identity of the subscriber to the network. In some cases, the wireless terminal itself contains the subscriber identification and authentication functionality so that a separate SIM and/or SIM card is not utilized.

In the SIM (or within the wireless terminal) an authentication key and a subscriber identification pair are stored. An example of such a pair would be the authentication key Ki as used in GSM networks and the associated subscriber identification IMSI (International Mobile Subscriber Identity). Another example would be the authentication key A-Key and subscriber identification MIN (Mobile Identification Number) as used in CDMA and TDMA networks. In either case, a corresponding identical set of an authentication key and a subscriber identification are stored in the network. In the SIM (or in the wireless terminal) and within the network, the authentication functionality is run using the local authentication key and some authentication data which is exchanged between the SIM and the network. If the outcomes of running the authentication functionality in the SIM and in the network leads to the same result, then the SIM/wireless terminal are considered to be authenticated for the wireless network.

In existing wireless systems, a SIM (or wireless terminal) has an authentication key associated with only one subscriber identification and this subscriber identity is typically tied to a local region or network. When a SIM (or wireless terminal) authenticates in a region that is not local or with a network that is not local, then usually the SIM (or wireless terminal) needs to pay additional roaming service charges to connect with the wireless network. It would be beneficial if the SIM (or wireless terminal) were not tied to a local region or network. For example, equipment vendors would then be able to sell the same equipment in multiple regions and for multiple networks and also roaming service charges might be avoided.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical, electronic or wireless communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A self-provisioning wireless terminal for a wireless network is disclosed. A wireless signal is received from a wireless network. A network identification is decoded from the wireless signal. A subscriber identification is selected based at least in part on the decoded network identification. Wireless service is acquired from the wireless network. A wireless terminal identifies the wireless network it is operating in from information broadcasted by the wireless network. The wireless terminal provisions itself as a local wireless terminal for that network or for a network with which the local network has a preferred relationship. The wireless terminal can provision itself, or acquire telecommunications service, as a local terminal by using a stored set of authentication key-subscriber identification that is specific to the network it is operating in. In various embodiments, the wireless terminal can provision itself as a local terminal by downloading a specific set of authentication key-subscriber identification or by downloading a subscriber identification to pair with an existing authentication key.

Figure 1:
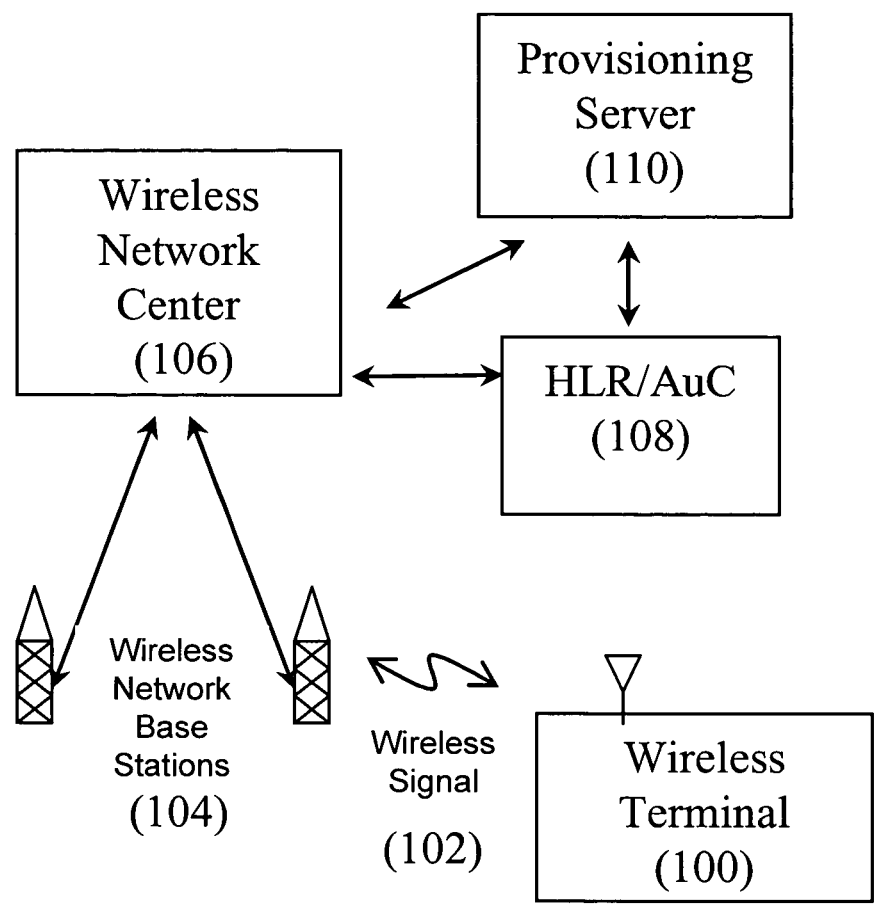
FIG. 1 illustrates an embodiment of a self-provisioning wireless system.

FIG. 1 illustrates an embodiment of a self-provisioning wireless system. In the example shown, the wireless system includes a plurality of wireless terminals, represented in FIG. 1 by wireless terminal 100, a plurality of wireless network base stations, represented by wireless network base stations 104, wireless network center 106, Home Location Register/

Authentication Center (HLR/AuC) 108, and provisioning server 110 capable of provisioning the wireless terminals. Wireless terminal 100 includes a Subscriber Identity Module (SIM) which is either an attachable hardware card with a memory and a processor or a software object embedded in the wireless terminal. Wireless network center 106 includes a Mobile Switching Center/Visitor Location Register (MSCNLR) and a Serving GPRS Service Node (SGSN), or Packet Data Serving Node (PDSN). Wireless terminal 100 communicates with wireless network base stations 104 using wireless signal 102. As a wireless terminal moves around it communicates with different wireless base stations. Wireless network base stations 104 communicate with wireless network center 106. Wireless terminal 100 may include various hardware and/or software components for performing various functions of the wireless terminal 100. Wireless terminal 100 may include a network identification decoding component configured to receive a wireless signal from a wireless network without wireless service being acquired from the wireless network and decoding a network identification from the wireless signal, a subscriber identification selection component configured to select a subscriber identification based at least in part on the decoded network identification, wherein the subscriber identification is one of a plurality of subscriber identifications associated with an authentication key, and wherein subscriber identification and authentication key comprise a stored set of authentication key-subscriber identification associated with the wireless network, and a wireless service acquiring component configured to acquire wireless service from the wireless network using the subscriber identification and authentication key.

Communications from a wireless terminal are passed to another wireless terminal over the same wireless network using a local wireless network base station to the other wireless terminal or the communications are carried by a wired network or other wireless network to the destination terminal. When acquiring wireless network service wireless network center 106 communicates with HLR/AuC 108, where sets of authentication key-subscriber identification are stored, to help in authenticating a wireless terminal that is acquiring wireless network service. Wireless network service center 106 and HLR/AuC 108 communicate with provisioning server 110 to enable a wireless terminal to acquire a new subscriber identification that is paired with an existing authentication key and/or a new set of authentication key-subscriber identification. In some embodiments the transmission of the authentication key or the authentication key-subscriber identification is encrypted. In various embodiments, the authentication key or the authentication key-subscriber identification is/are decrypted at the wireless terminal and/or in the SIM card. The old authentication key-new subscriber identification pair and/or the new set of authentication key-subscriber identification are added in the appropriate manner to the HLR/AuC 108 databases so that the wireless terminal can be authenticated and can acquire wireless network service using the new subscriber identification and/or authentication key set. In various embodiments, the wireless network system is a cellular system, a GSM/GPRS wireless system, a CDMA or WCDMA wireless system, or a TDMA wireless system, or any other type of wireless network system.

Figure 2:
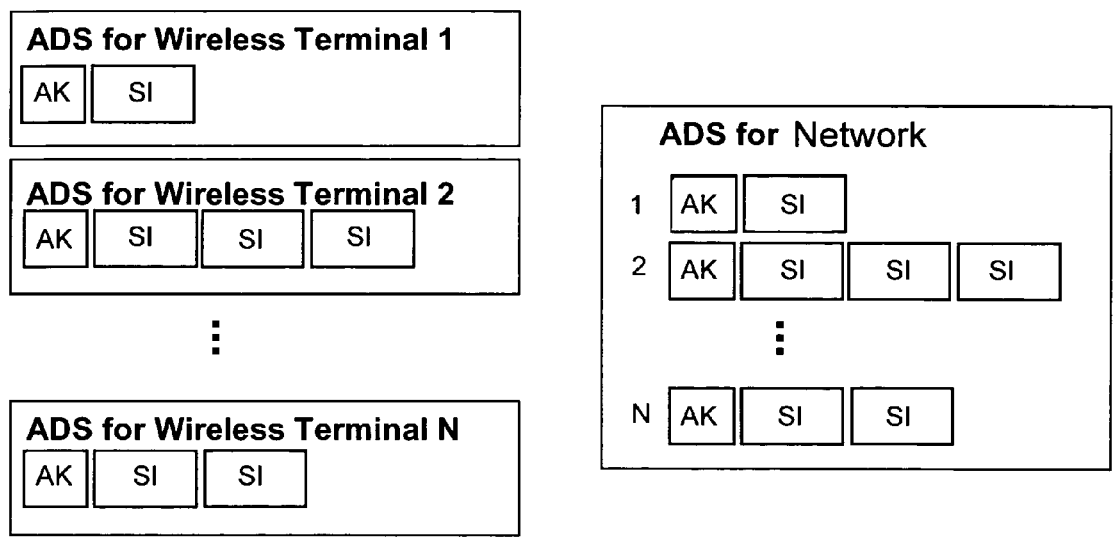
FIG. 2 illustrates an example of authentication data structures in one embodiment.

FIG. 2 illustrates an example of authentication data structures in one embodiment. In some embodiments, the authentication data structure for a wireless terminal is located in the SIM and for the network in the HLR/AuC such as HLR/Auc 108 of FIG. 1. An authentication data structure (ADS) for a wireless terminal includes an authentication key (AK) and one or more subscriber identifications (SI) and is used to help authenticate a wireless terminal for a wireless network. In the example shown, the ADS for wireless terminal 1 includes one authentication key and one subscriber identification. The ADS for wireless terminal 2 includes one authentication key and three subscriber identifications. The ADS for wireless terminal N includes one authentication key and two subscriber identifications. The ADS for network includes the authentication key-subscriber identification entries for each of the wireless terminals. Entries for wireless terminal 1, 2, and N are shown. In some embodiments, there are more than one authentication keys where each authentication key has multiple subscriber identifications.

Figure 3:
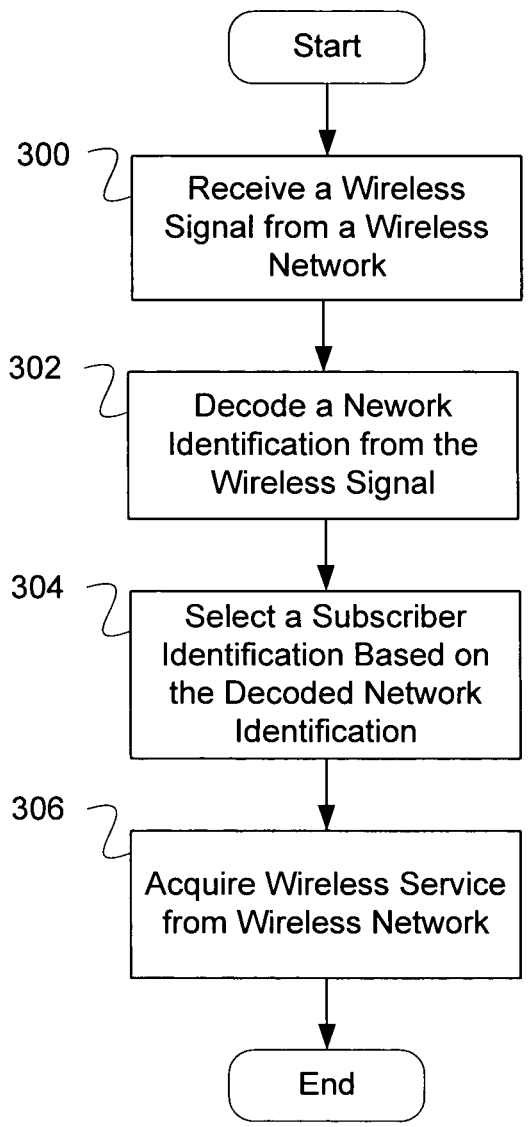
FIG. 3 is a flow diagram illustrating an embodiment of a process for acquiring wireless service from a wireless network.

FIG. 3 is a flow diagram illustrating an embodiment of a process for acquiring wireless service from a wireless network. In some embodiments, the process of FIG. 3 is implemented on a wireless terminal such as wireless terminal 100 in FIG. 1. In the example shown, in 300 a wireless signal is received from a wireless network. A wireless terminal receives wireless signals from a nearby network base station. In 302, a network identification is decoded from the wireless signal. The wireless signal includes a mobile network identification. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. In 304, a subscriber identification is selected based on the decoded network identification. For example, LAI information can be matched with the subscriber identification of the wireless terminal, which includes a mobile country code, a mobile network code, and a mobile subscriber identification number. In various embodiments, the LAI mobile country code and subscriber identification mobile country code are matched or the LAI mobile network code and the subscriber identification mobile network code are matched. In various embodiments, the selection of a subscriber identification is based at least in part on the pricing of different wireless networks, the billed account for that connection, a billed account for the wireless service, the application that will use the connection, an application using the wireless service (for example, one subscriber identification for data communication and a different subscriber identification for voice communication) or any other appropriate criteria for selecting a subscriber identification. In 306, wireless service is acquired from the wireless network.

Figure 4:
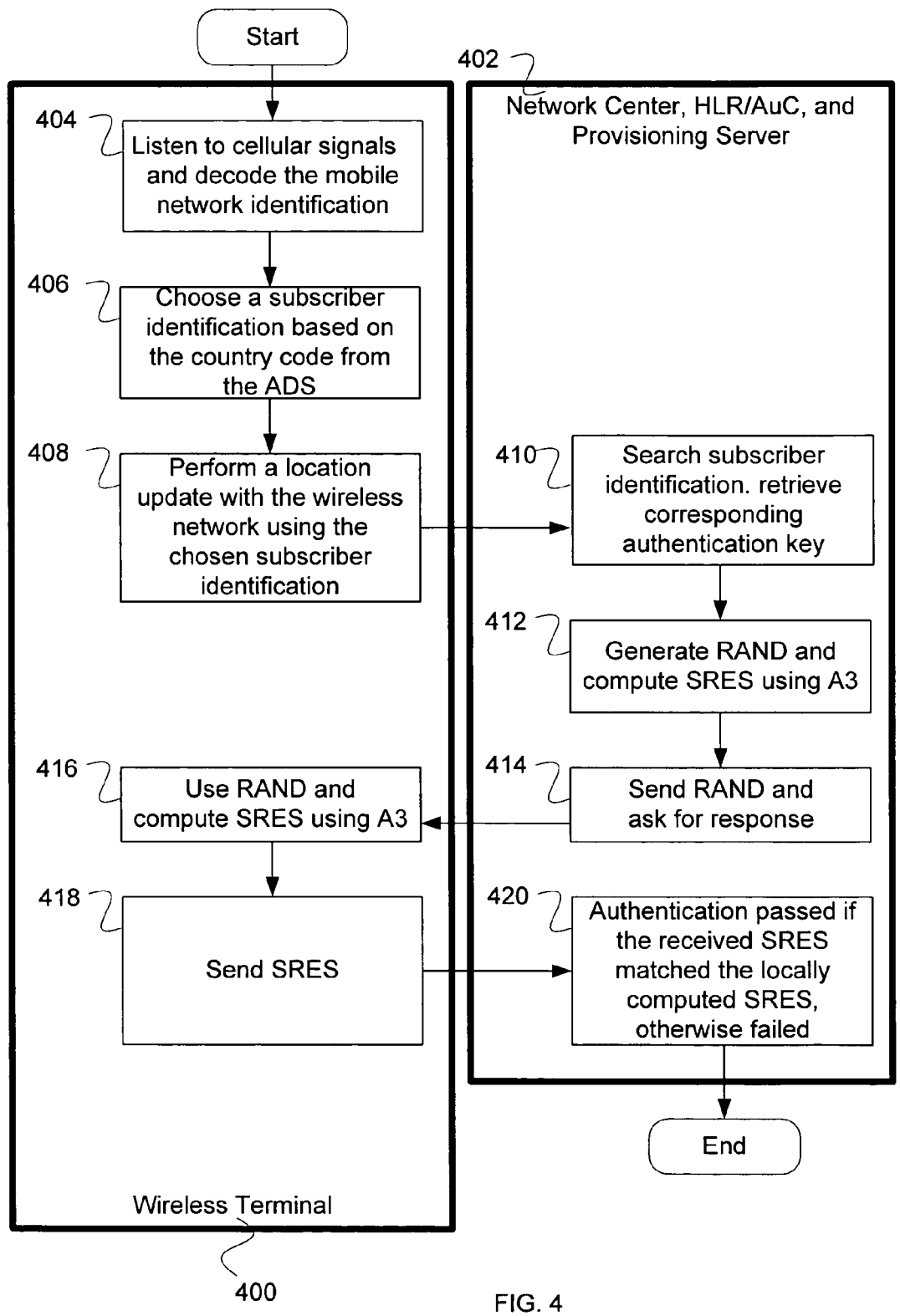
FIG. 4 illustrates an embodiment of a process for self-provisioning or authentication of a wireless terminal in a network system.

FIG. 4 illustrates an embodiment of a process for self-provisioning or authentication of a wireless terminal in a network system. In the example shown, wireless terminal 100 receives information from and transmits information to network center 106, HLR/AuC 108, and provisioning server 110 using wireless signals 102. In 404, wireless terminal 100 listens to wireless signals 102 transmitted from network base stations 104 and decodes the mobile network identification from the transmitted information. For example, the wireless terminal scans for the existing wireless system signals. When it finds a network system broadcast control channel (e.g. BCCH in GSM Systems), it decodes the broadcasted information to decode the Location Area Identifier (LAI). The LAI is composed of a mobile country code, a mobile network code and a location area code. From the LAI, the wireless terminal can determine the country in which it is operating. In 406, the wireless terminal chooses a Subscriber Identification with the same country code from its ADS. For example, the Subscriber Identification is composed of a mobile country code, a mobile network code, and mobile subscriber identification number.

The codes in the Subscriber Identification can be used to match a Subscriber Identification to the local network and/or country. The rest of the Subscriber Identifications stored in the wireless terminal's ADS may be made inactive for the duration of the session.

In 408, the wireless terminal performs a location update with the wireless network using the chosen Subscriber Identification. In 410, the network center, HLR/AuC, and provisioning server 402 searches for the Subscriber Identification in its ADS and retrieves the corresponding Authentication Key. In 412, a challenge is generated (RAND) and with the Authentication Key is used to calculate a Response (SRES) using an authentication algorithm (A3). In 414, the RAND is sent to the wireless terminal and a response is requested. In 416, the wireless terminal uses the RAND with the Authentication Key from its ADS to independently calculate a SRES using encryption algorithm (A3) stored in its SIM. In 418, the SRES is sent to the network center and/or HLR/AuC and/or provisioning server 402. In 420, authentication is passed if the received SRES matches the locally computed SRES, otherwise the authentication fails.

Figure 5:
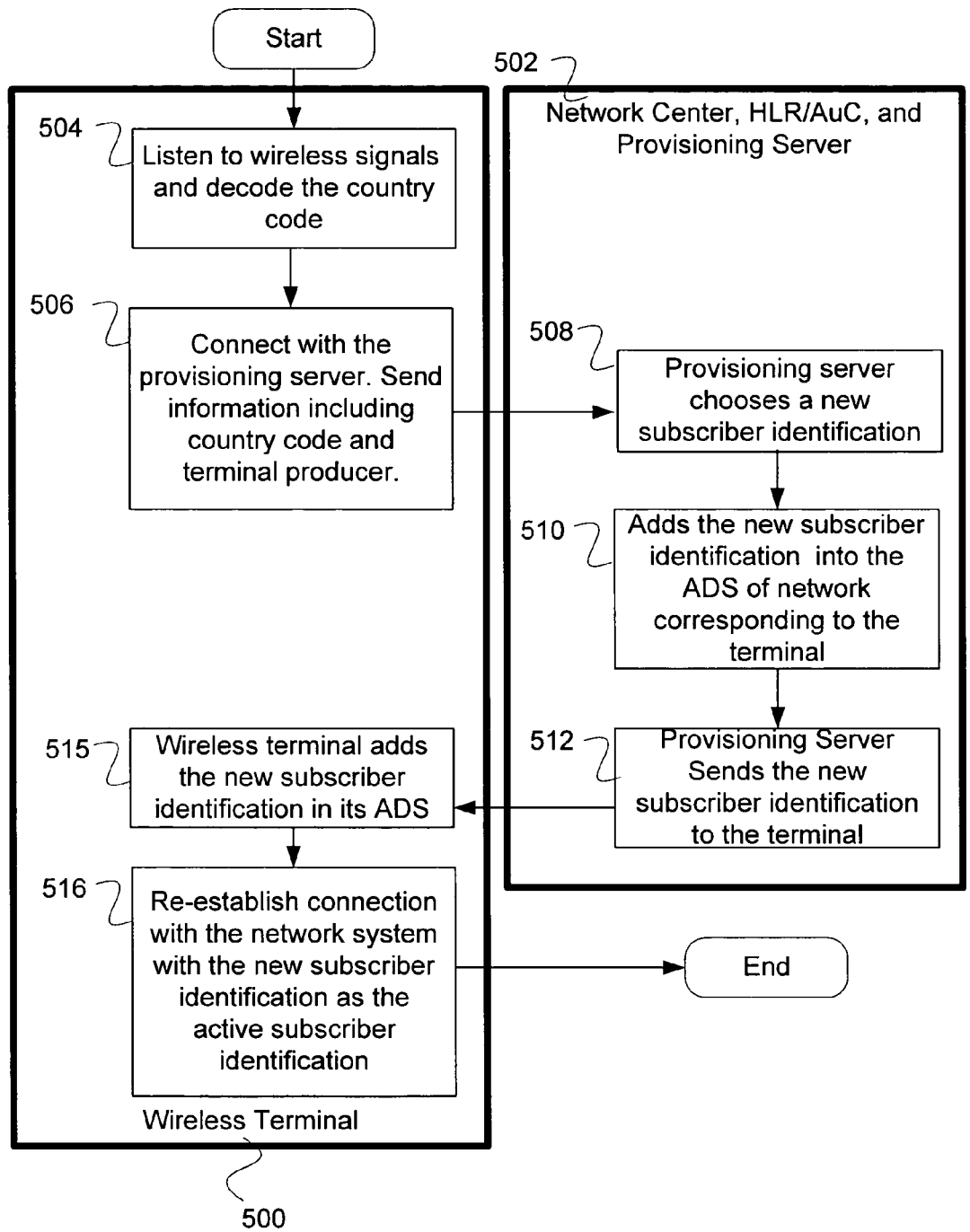
FIG. 5 illustrates an embodiment of a process for self-provisioning or authentication, of a wireless terminal in a network system.

FIG. 5 illustrates an embodiment of a process for self-provisioning or authentication of a wireless terminal in a network system. In some embodiments, the wireless terminal will not contain a Subscriber Identification that matches the network code and/or country code of the local network system. Self-provisioning can be achieved by connecting using a Subscriber Identification with another network/country code and then downloading a local Subscriber Identification (i.e. with a matching country code). In the example shown, wireless terminal 100 receives information from and transmits information to network center 106, HLR/AuC 108, and provisioning server 110 using wireless signals 102. In 504, wireless terminal 100 listens to wireless signals transmitted from network base stations 104 and decodes the mobile network identification from the transmitted information similar to 404 above. In 506, wireless terminal 100 communicates, after authenticating itself using a process similar to 408-420 above, with the provisioning server transmitting information including a country code and a terminal producer. In 508, the provisioning server chooses a new Subscriber Identification with a local country code and/or network code. In 510, the new Subscriber Identification is added to the ADS of the HLR/AuC corresponding to the wireless terminal (i.e. paired with the wireless terminal's Authentication Key). In 512, the provisioning server sends the new Subscriber Identification to wireless terminal 500. In 515, wireless terminal 100 adds the new Subscriber Identification to its ADS. In 516, wireless terminal 100 reestablishes its connection with the network system with the new Subscriber Identification as the active Subscriber Identification. In some embodiments, depending on the information transmitted (e.g., subscriber identification range or type of wireless terminal), communication may be established between the wireless terminal and a specific application server (e.g., a proprietary systems' application server or another company's Application Server). In some embodiments, this communication with a specific application server is encrypted.

Figure 6:
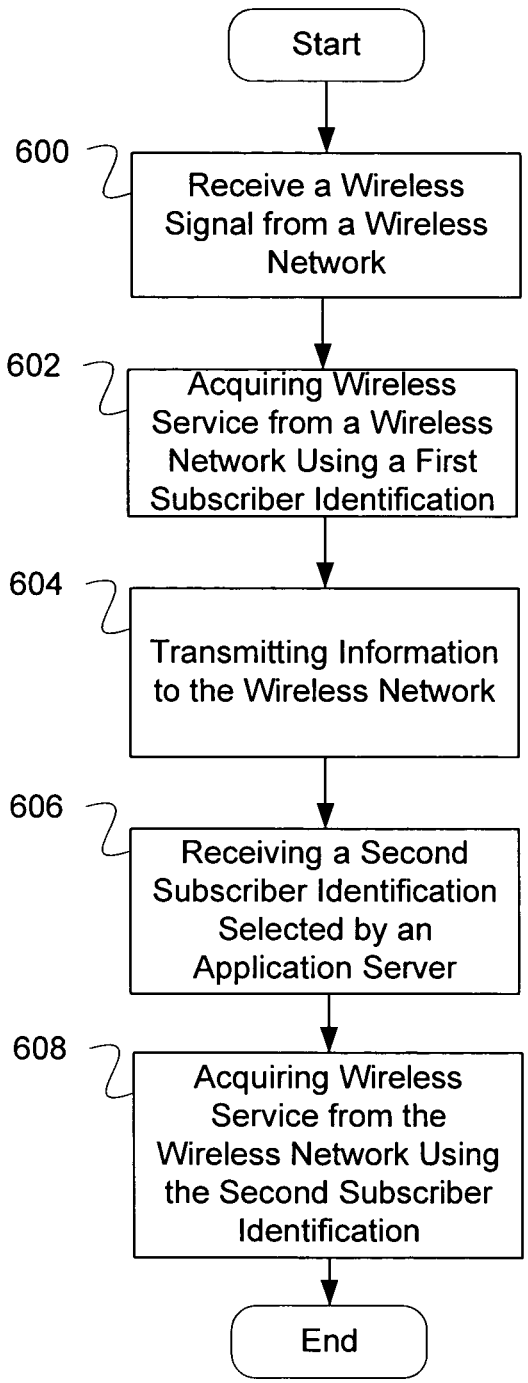
FIG. 6 is a flow diagram illustrating an embodiment of a process for acquiring wireless service from a wireless network.

FIG. 6 is a flow diagram illustrating an embodiment of a process for acquiring wireless service from a wireless network. In the example shown, in 600 a wireless signal is received from a wireless network. In 602, wireless service is acquired from the wireless network using a first subscriber identification. In 604, information is transmitted to the wireless network. In 606, a second subscriber identification, which is selected by an application server, is received. The second subscriber identification is selected based at least in part on one or more of the following: the wireless network, the wireless network identification, the base station that the wireless terminal is communicating with, the local country associated with the network, or any other appropriate criteria for selecting a subscriber identification. In various embodiments, the first subscriber identification and the second subscriber identification are both paired with a single authentication key or the first subscriber identification is paired with a first authentication key and the second subscriber identification is paired with a second authentication key. In some embodiments, a second authentication key is received. In various embodiments, the subscriber identification and/or the authentication key are received after having been encrypted and need to be decrypted after having been received. In some embodiments, the subscriber identification is encrypted and decrypted using an authentication key. In various embodiments, a subscriber identification and/or a authentication key is encrypted in an application server, in a wireless network server, or in a combination of an application server and a wireless network server, or in any other appropriate place for the encryption. In various embodiments, a subscriber identification and/or an authentication key is decrypted in a wireless terminal, in a SIM card, or in a combination of the SIM card and the wireless terminal, or in any other appropriate place for the decryption. In some embodiments, authentication information is received—for example, a random number that has been encrypted using an authentication key, a subscriber identification that has been encrypted using an authentication key, or other information that has been encrypted using an authentication key or other appropriate key. In 608, wireless service is acquired from the wireless network using the second subscriber identification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system operating in a mobile wireless network comprising:
   a first home location register (HLR) containing a plurality of subscriber identifications allocated to the system; and
   a provisioning server coupled to the first HLR and operative to communicate with the mobile wireless network including a plurality of mobile switching centers (MSCs) and a plurality of mobile devices operating in the mobile wireless network, wherein the provisioning server receives a signal from the mobile wireless network specifying a location of a first mobile device having a first subscriber identification and operating in the mobile wireless network under a first condition, provisions the first HLR to add a second subscriber identification not previously provisioned corresponding to the first mobile device and the location, and transmits data identifying the second subscriber identification to the first mobile device to allow the first mobile device to operate in the mobile wireless network under a second condition.

2. The system of claim 1, wherein the first HLR communicates authentication data to the mobile wireless network to allow the first mobile device to operate under the second condition in the mobile wireless network.

3. The system of claim 1, wherein the first HLR communicates authentication data to one of the MSCs operating in the mobile wireless network to allow the first mobile device to operate under the second condition in the mobile wireless network.

4. The system of claim 1, wherein the first HLR transmits authentication data to a second HLR operating in the mobile wireless network to allow the first mobile device to operate under the second condition in the mobile wireless network.

5. The system of claim 1, wherein the plurality of subscriber identifications allocated to the system include a plurality of subsets of subscriber identifications, each subset of subscriber identifications corresponding to a unique country code.

6. The system of claim 1, wherein the plurality of subscriber identifications allocated to the system include a plurality of subsets of subscriber identifications, each subset of subscriber identifications corresponding to a unique network code.

7. The system of claim 1, wherein the plurality of subscriber identifications allocated to the system include a plurality of subsets of subscriber identifications, each subset of subscriber identifications corresponding to a unique country code and at least one unique network code.

8. The system of claim 1, wherein the first condition includes a roaming condition and the second condition includes a non-roaming condition.

9. The system of claim 1, wherein a subscriber identification includes an International Mobile Subscriber Identity (IMSI).

10. A method of operating a mobile wireless network comprising:
receiving, by a provisioning server, a signal from a mobile wireless network specifying a location of a first mobile device having a first subscriber identification and operating in the mobile wireless network under a first condition, the mobile wireless network including a plurality of mobile switching centers (MSCs) and a plurality of mobile devices operating in the mobile wireless network;
provisioning a first home location register (HLR) by the provisioning server to add a second subscriber identification not previously provisioned corresponding to the first mobile device and the location, the first HLR containing a plurality of second subscribers; and
transmitting data identifying the second subscriber identification to the first mobile device to allow the first mobile device to operate in the mobile wireless network under a second condition.

11. The method of claim 10, wherein the first HLR communicates authentication data to the mobile wireless network to allow the first mobile device to operate under the second condition in the mobile wireless network.

12. The method of claim 10, wherein the first HLR communicates authentication data to one of the MSCs operating in the mobile wireless network to allow the first mobile device to operate under the second condition in the mobile wireless network.

13. The method of claim 10, wherein the first HLR transmits authentication data to a second HLR operating in the mobile wireless network to allow the first mobile device to operate under the second condition in the mobile wireless network.

14. The method of claim 10, wherein the plurality of subscriber identifications include a plurality of subsets of subscriber identifications, each subset of subscriber identifications corresponding to a unique country code.

15. The method of claim 10, wherein the plurality of subscriber identifications include a plurality of subsets of subscriber identifications, each subset of subscriber identifications corresponding to a unique network code.

16. The method of claim 10, wherein the plurality of subscriber identifications include a plurality of subsets of subscriber identifications, each subset of subscriber identifications corresponding to a unique country code and at least one unique network code.

17. The method of claim 10, wherein the first condition includes a roaming condition and the second condition includes a non-roaming condition.

18. The method of claim 10, wherein a subscriber identification includes an International Mobile Subscriber Identity (IMSI).

* * * * *